(12) United States Patent
Montero Basqueseaux (10) Patent No.: US 8,602,436 B2
(45) Date of Patent: Dec. 10, 2013

(54) FOLDABLE BICYCLE

(76) Inventor: Joaquín Montero Basqueseaux, San Sebastian (ES)

( * ) Notice: Subject to any disclaimer, the term of this patent is extended or adjusted under 35 U.S.C. 154(b) by 0 days.

(21) Appl. No.: 13/811,452

(22) PCT Filed: Oct. 11, 2010

(86) PCT No.: PCT/EP2010/065163
§ 371 (c)(1),
(2), (4) Date: Jan. 22, 2013

(87) PCT Pub. No.: WO2012/010221
PCT Pub. Date: Jan. 26, 2012

(65) Prior Publication Data
US 2013/0119635 A1    May 16, 2013

(30) Foreign Application Priority Data
Jul. 23, 2010   (ES) .................................. 201031144

(51) Int. Cl.
*B62K 15/00*      (2006.01)
(52) U.S. Cl.
USPC .......................................... 280/278; 280/287
(58) Field of Classification Search
USPC ................................. 280/278, 287
See application file for complete search history.

(56) References Cited

U.S. PATENT DOCUMENTS

| 5,052,706 A | 10/1991 | Tsai et al. |
| 8,308,178 B2 * | 11/2012 | Hoerdum et al. ............. 280/278 |
| 2008/0061528 A1 | 3/2008 | Musabi |

FOREIGN PATENT DOCUMENTS

| DE | 44 23 647 A1 | 1/1996 |
| EP | 1142780 A2 | 10/2001 |
| EP | 1 591 352 A1 | 11/2005 |
| WO | 2010/048723 A1 | 5/2010 |

\* cited by examiner

*Primary Examiner* — Kevin Hurley
*Assistant Examiner* — Marc A Scharich
(74) *Attorney, Agent, or Firm* — McGlew and Tuttle, P.C.

(57) ABSTRACT

Foldable bicycle including a first frame part (1) that supports the front wheel (4) and a second frame part (2) that supports the rear wheel (5), joined together by a joint (3) with a single geometrical rotation axis (X1) tilted with respect to the direction perpendicular to the bicycle's longitudinal plane. The joint (3) is an annular joint in the form of a ring that delimits an inner free space (6) that is wide enough to receive the hand of an adult, so that it forms a handle which is pulled upwards to produce the movement from the bicycle's unfolded position to the bicycle's folded position thanks to the actual weight of the bicycle and the relative rotation of the two frame parts (1, 2) around the geometrical rotation axis (X1).

17 Claims, 8 Drawing Sheets

FOLDABLE BICYCLE

FIELD OF THE INVENTION

The invention relates to the field of foldable bicycles.

More particularly, the invention relates to a foldable bicycle of the type comprising at least one first frame part that supports the front wheel of the bicycle and a second frame part that supports the rear wheel of the bicycle, said first and second frame parts being joined together by a joint having one single geometrical rotation axis tilted with respect to the direction perpendicular to the longitudinal plane of the bicycle, so that, by rotating said first and second frame parts relatively one with respect to the other around the geometrical rotation axis, the bicycle moves from an unfolded position, wherein the front wheel is aligned with the rear wheel in the longitudinal plane of the bicycle, to a folded position wherein the front wheel lies next to the rear wheel in a different plane thereto, and also comprising a handle which is pulled upwards to produce the movement from the unfolded position to the folded position of the bicycle thanks to the actual weight of the bicycle and the relative rotation of the first and second frame parts around the geometrical rotation axis.

STATE OF THE ART

Foldable bicycles wherein the joint between the two frame parts has a rotation axis tilted with respect to the direction perpendicular to the longitudinal plane of the bicycle, have the advantage that the bicycle folding and unfolding manoeuvres are performed taking up very little side space. Document U.S. Pat. No. 5,052,706 discloses a bicycle of this type, wherein the two frame parts are joined, as well as by the joint, by an auxiliary bar made up of two parts and comprising a lever intended for unblocking the relative movements between these two parts. Although it is possible to unblock the auxiliary bar with just one hand, the bicycle folding manoeuvre is still relatively cumbersome. Furthermore, this solution is complicated from the constructive point of view and, also, the presence of the auxiliary bar interferes with using the bicycle.

Document EP1142780 discloses a bicycle of the type indicated at the beginning, comprising a handle which is pulled upwards to move from the unfolded position to the folded position thanks to the actual weight of the bicycle and the relative rotation of the two frame parts around the geometrical rotation axis of the joint. It is a motorised bicycle, comprising a handle arranged behind the seat bar and with a button for unblocking the joint. The user acts upon the handle to perform the bicycle folding and unfolding manoeuvres, during which the two bicycle wheels continue to turn around on the ground. The handle also is used to drag the bicycle when it is in the folded position. Although this bicycle offers greater handling comfort thanks to the handle, its constructive configuration is relatively complicated. Furthermore, the handle is a projecting element that is exposed, and therefore it constitutes a weak point. Another drawback is that the handle takes up space that compromises the installation of a rear carrier.

DISCLOSURE OF THE INVENTION

The aim of the invention is to provide a foldable bicycle of the type indicated at the beginning, which allows using just one hand to perform the bicycle unfolding and folding mechanisms while keeping the two wheels turning around on the ground, and which has a simpler and more robust constructive configuration than the foldable bicycles known in the state of the art, without compromising the installation of usual complements such as a rear carrier.

This aim is achieved by means of a bicycle of the type indicated at the beginning, characterized in that the joint that links together the first and second frame parts is an annular joint, in the shape of a ring which delimits an inner free space that is wide enough to receive an adult hand across the whole width of the fingers, except for the thumb, so that said annular joint in itself constitutes the handle. This width of the free space is understood to be measured along the bicycle's longitudinal plane. When this width is at least eight centimeters, the joint fulfils the function of a handle that is sufficiently comfortable for the user.

This solution avoids adding a handle as an additional device, since the handle is advantageously formed by the actual annular joint. In order to perform the bicycle folding manoeuvre, the user inserts the four fingers of his hand into the inner free space of the annular joint, in the same way as he would do so when gripping the handle of a bag, or suitcase etc., and simply pulls upwards thus causing the bicycle to fold thanks to the actual weight of the two frame parts. In order to perform the bicycle unfolding manoeuvre, the user supports the bicycle by the handle in the same way, but instead of pulling upwards, he lets the two frame parts fall down due to their own weight into the folded position.

Also, the invention covers a series of preferable characteristics that are the object of dependent claims.

Preferably, the inner surface of the annular joint, which delimits the inner free space, is in itself an integral surface, in other words that there is no relative movement between its parts, and it is free to rotate around the geometrical rotation axis of the joint with respect to at least one of the first and second frame parts. This inner surface can be one individual part or it can be made up of various parts firmly assembled together. Thanks to this configuration, the user can hold the handle by resting his fingers across the whole width of said inner surface without interfering with the relative rotation movement between the first and second frame parts. So, manipulating the handle in the bicycle folding and unfolding manoeuvres is more comfortable and safer. In particular, the user is prevented from hurting himself due to the relative movement of the parts forming the joint.

It can be envisaged that said inner surface of the annular joint, which delimits the inner free space, be free to rotate with respect to the two frame parts. However, in a preferable configuration that offers greater structural simplicity and suitable handling comfort, said inner surface is integral with one of the first and second frame parts and is free to rotate, around the geometrical rotation axis, with respect to the other frame part.

Preferably, the annular joint is made up of a first annular part that is integral with the first frame part, a second annular part that is integral with the second frame part, said first and second annular parts fitting together in the axial direction of the geometrical rotation axis of the joint and being able to rotate one with respect to the other around said axis, and a retaining part that is removably attached to one of the first and second annular parts and comprises an axial support surface that blocks the axial movement of the other of said annular parts. This configuration, which can be implemented according to various constructive solutions, offers the advantages of low manufacturing costs and easy assembly.

In a preferable constructive solution, said retaining part comprises a cylindrical part that covers the inner faces of the first and second annular parts and it is removably integral with one of said annular parts by means of attachment means, so that the inner face of said cylindrical part constitutes the inner surface of the annular joint that delimits the inner free space, said retaining part comprising also at one of the ends of said cylindrical part a radial edge that extends radially in the opposite direction to said inner free space and whose inner face forms the axial support surface of the retaining part.

In an advantageous embodiment, in order to protect the user's hand against contact with the outer surfaces of the two annular parts that rotate with respect to each other, said retaining part extends into a cover that covers a section of the outer faces of said first and second annular parts.

Insofar as the union of the first and second frame parts to the joint is concerned, an advantageous constructive solution consists in each of the first and second annular parts having a frustoconical outer face tilted with respect to the geometrical rotation axis of the annular joint, with the tilt of each of these two outer faces being symmetrically opposite the other with respect to a diametrical plane of the annular joint, and with the first and second frame parts being integral with said outer faces, arranged orthogonally thereto.

Preferably, the annular joint itself comprises endstop means that limit the trajectory of relative rotation of the first and second frame parts one with respect to the other around the geometrical rotation axis of the annular joint, between a first end position corresponding to the bicycle's unfolded position and a second end position corresponding to the bicycle's folded position.

In an advantageous embodiment, said endstop means are formed on the axially opposite faces of the first and second annular parts and consist of a circular arched groove formed on one of said annular parts and a projection formed on the other one of said annular parts, said projection sliding freely inside said groove, so that each of the two ends of said groove forms an endstop for said projection.

The foldable bicycle according to the invention can be used without providing means for blocking the relative rotation of the two frame parts, since the actual weight of a person sitting on the bicycle pushes the two frame parts towards the bicycle's unfolded position and keeps them in said position. However, for greater safety, preferably blocking means are provided to block the relative angular position of the first and second frame parts, with respect to the geometrical rotation axis of the annular joint, at least in the unfolded position of the bicycle, said blocking means comprising a pin that is driven by elastic pushing means and which is inserted through a hole into one of the first and second annular parts so as to intercept an inner element of the other one of said first and second annular parts, thus blocking the relative rotation between them.

In the embodiment described above, wherein the endstop means that limit the trajectory of the relative rotation of the first and second frame parts consist of a circular arched groove formed on one of the annular parts and a projection formed on the other one of the annular parts, said pin comes out into said groove through a hole in the first annular part and intercepts said projection when this abuts against one end of said groove.

In the embodiment described above, where the retaining part extends into a cover that covers a section of the outer faces of the first and second annular parts, advantageously said pin is mounted on said cover and is integral with a pulling element located above said cover.

The invention also covers embodiments wherein the foldable bicycle comprises a third frame part that houses the shank of the bicycle seat, said third frame part being mounted in pivoting fashion on the second frame part so that it can pivot around a pivoting axis between a lowered position and an upright position.

In one embodiment, said third frame part is provided with a seating element on which there abuts a blocking element, integral with the outer face of the first annular part, when said third frame part is in the upright position and the first and second frame parts are in the unfolded position of the bicycle. This solution has the advantage that the actual joint, through said blocking element, fixes the upright position of the third frame part.

In another embodiment, the third frame part is provided with closing means that cooperate with complementary closing means arranged on the second frame part for blocking the pivoting of said third frame part when it is in the upright position, and the outer face of the first annular part integrally supports a first endstop element that extends in a cantilever arrangement over the outer face of the second annular part, said first endstop element being retained, in the folded position of the bicycle, by a first retention element arranged on said outer face of the second annular part, and said outer face of the first annular part integrally supports a second endstop element that is retained, in the unfolded position of the bicycle, by a second retention element that is arranged on the third frame part and which intercepts said second endstop element when the third frame part is in the upright position. This solution has the advantage that blocking the pivoting of the third frame part and blocking the relative rotation of the first and second frame parts is achieved comfortably in one single manoeuvre.

The invention also covers other characteristics of detail illustrated in the detailed description of an embodiment of the invention.

BRIEF DESCRIPTION OF THE DRAWINGS

The advantages and characteristics of the invention are appreciated from the following description which explains, in a non-limiting manner, some preferable embodiments of the invention with reference to the accompanying figures, wherein.

DETAILED DESCRIPTION OF SOME EMBODIMENTS OF THE INVENTION

FIGS. 1 to 8 show a first embodiment of the foldable bicycle according to the invention. The bicycle comprises a first frame part 1 that supports the front wheel 4, a second frame part 2 that supports the rear wheel 5 and a third frame part 23 that houses the shank 24 of the seat 25.

Figure 5:
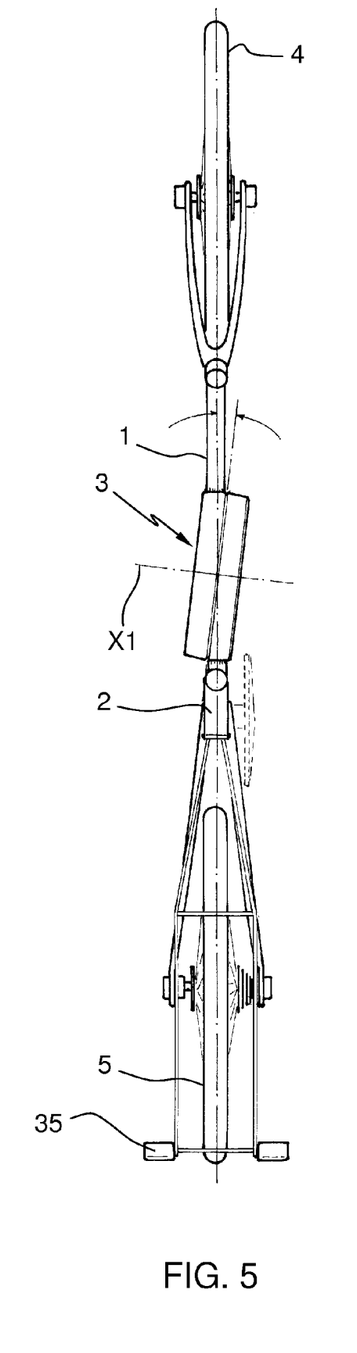
FIGS. 5 and 6 are, respectively, a top view of the bicycle in the unfolded position and a rear view of the bicycle in the folded position.
Figure 6:
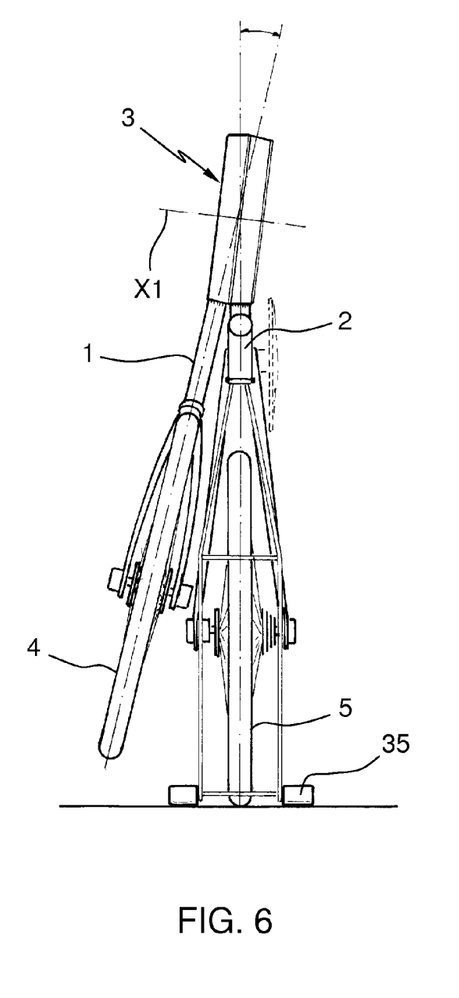

First 1 and second 2 frame parts are joined by a joint 3 that has one single geometrical rotation axis X1 tilted with respect to the direction perpendicular to the longitudinal plane of the bicycle. The longitudinal plane of the bicycle is the plane in which the two bicycle wheels 4, 5 are aligned in the unfolded position, as shown in FIG. 5. FIGS. 5 and 6 indicate the angle of tilt between the plane perpendicular to axis X1 and the bicycle's longitudinal plane; obviously, this angle is equal to the one formed by axis X1 and the direction perpendicular to the bicycle's longitudinal plane. Thanks to this tilt of axis X1, via the relative rotation of the two frame parts 1 and 2 around axis X1 of joint 3, the bicycle moves from the unfolded position shown in FIGS. 1 and 5, wherein front wheel 4 is aligned with rear wheel 5 in the bicycle's longitudinal plane, to the folded position shown in FIGS. 2 and 6, wherein front wheel 4 lies next to rear wheel 5 in a different plane thereto.

Figure 4:
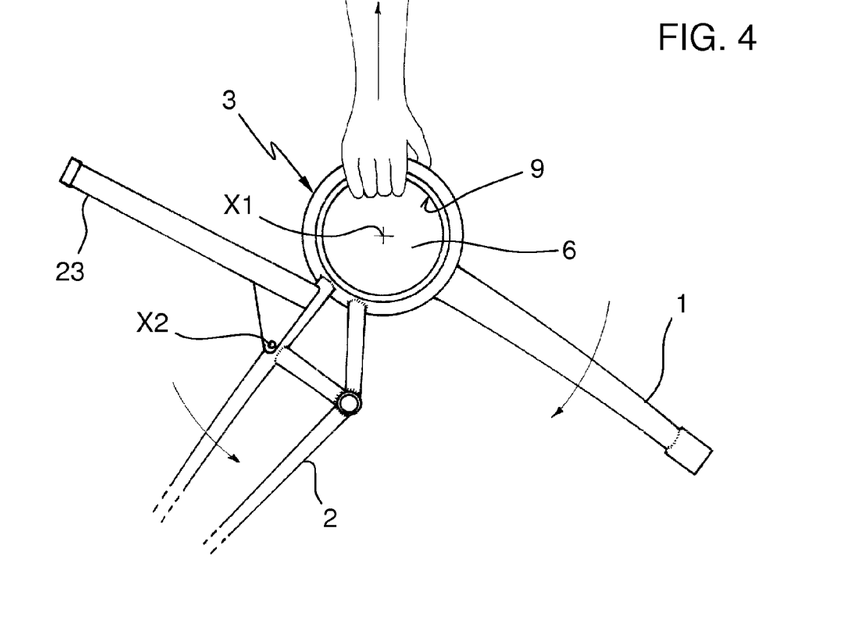
FIG. 4 is a partial side view showing the way that a user catches the annular joint in one hand, like a handle, and pulls it upwards to cause the folding movement of the bicycle.

Joint 3 is configured like an annular joint, in the shape of a ring that delimits an inner free space 6 that is wide enough to receive the hand of an adult across the width of the fingers, with the exception of the thumb. As shown in FIG. 4, annular joint 3 thus shaped constitutes in itself a handle by which the user supports the bicycle and pulls it upwards, producing the relative rotation of the two frame parts 1 and 2 one with respect to the other around axis X1 thanks to the actual weight of said frame parts. Inner free space 6 is preferably wider than eight centimeters. In the embodiment described herein, inner free space 6 is circular and its diameter is 11 centimeters wide. However, others shapes can be use for the inner free space 6, such as for example a shape adapted to the phalanges of a hand, adding an inner part that forms said inner free space 6.

Figure 3:
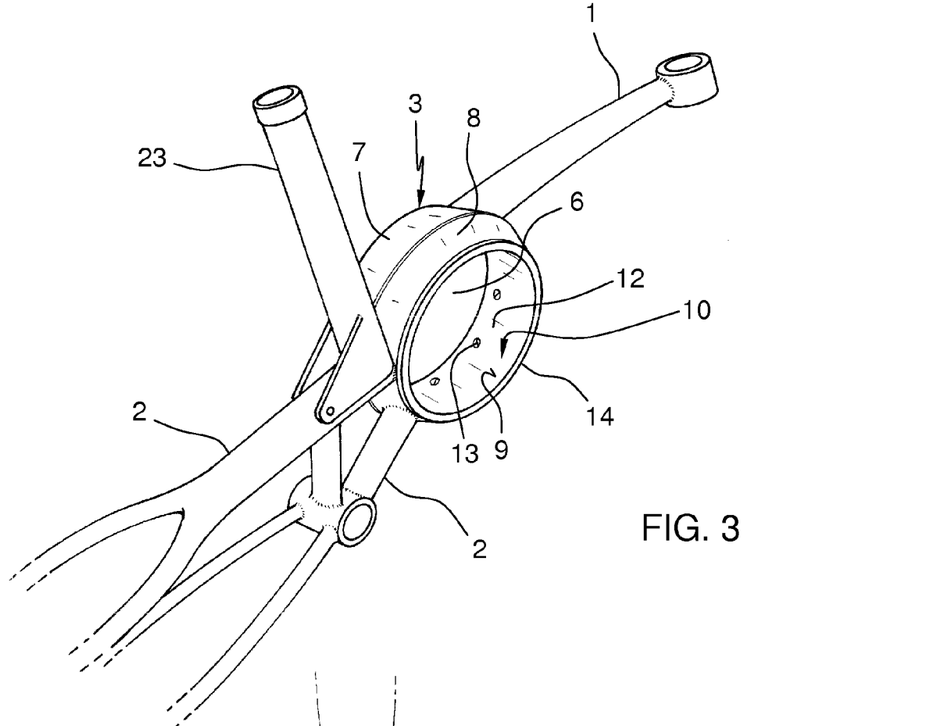
FIG. 3 is a partial perspective view showing the area of the annular joint.
Figure 7:
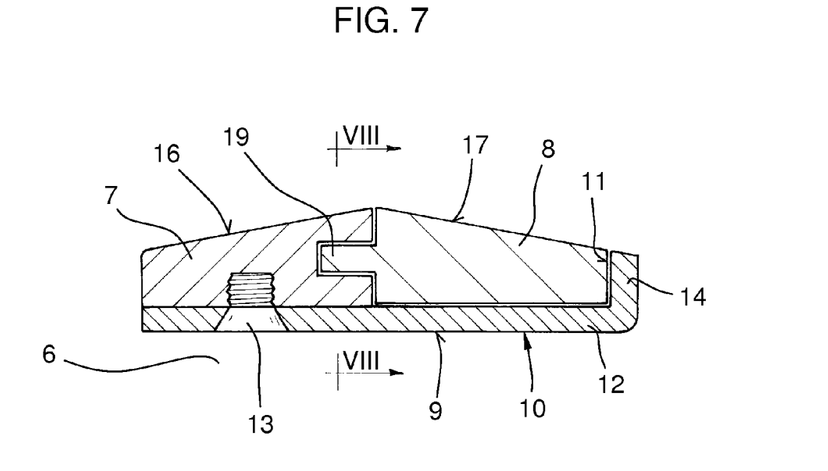
FIG. 7 is a partial cross-sectional view of the annular joint.
Figure 8:
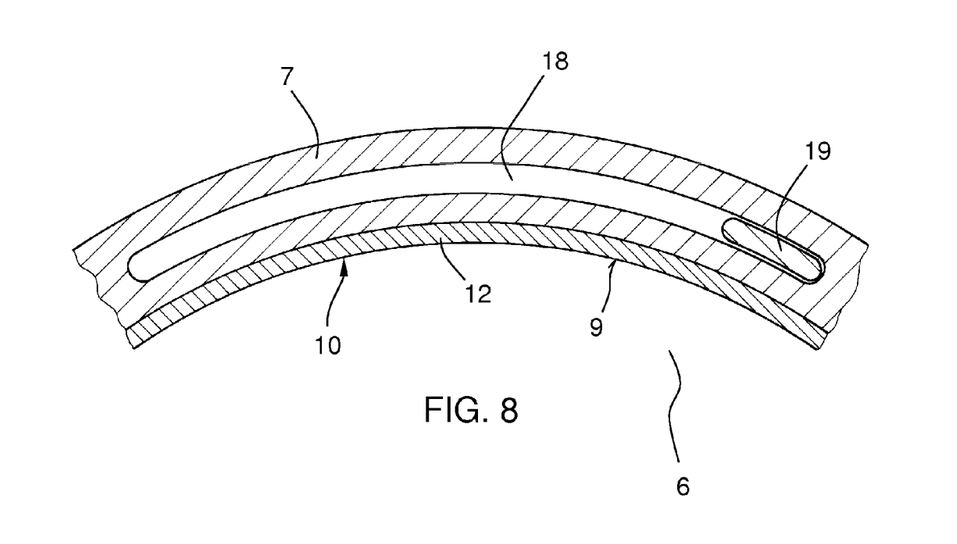
FIG. 8 is a sectional view along line VIII-VIII in FIG. 7.

The constructive configuration of annular joint 3 is shown in FIGS. 3, 7 and 8. Annular joint 3 is made up of a first annular part 7 that is integral with first frame part 1, a second annular part 8 that is integral with second frame part 2 and a retaining part 10 that is removably attached to first annular part 7.

The two annular parts 7 and 8 fit together in the axial direction of the geometrical rotation axis X1 so that they are free to rotate one with respect to the other around axis X1. As can be seen in FIGS. 5, 6 and 7, each of these annular parts 7, 8 has a frustoconical outer face 16, 17, tilted with respect to axis X1, so that the tilt of each outer face 16, 17 is symmetrically opposite the other with respect to the diametrical plane of annular joint 3. The tubes of first and second frame parts 1, 2 are integral with these outer faces 16, 17 in the orthogonal direction thereto. This configuration makes it easy to manufacture the joint system integrated on the bicycle frame. Each frame part 1, 2 is welded to the corresponding annular part 7, 8 and these two units are joined by axially coupling these two annular parts 7, 8.

The axial attachment of the two annular parts 7, 8 is achieved by means of retaining part 10, that has a cylindrical part 12 provided at one of its ends with a radial edge 14 that extends in the radial direction opposite inner free space 6. As can be seen in FIG. 7, retaining part 10 is axially coupled to the unit made up of the two annular parts 7, 8, so that cylindrical part 12 covers the inner faces of these two annular parts 7, 8. Retaining part 10 is attached to first annular part 7, but does not prevent the free rotation of second annular part 8. The attachment of retaining part 10 to annular part 7 is achieved by means of screws 13 that thread into threaded holes on the inner face of annular part 7, through holes in cylindrical part 12. In this configuration, the inner face of cylindrical part 12 of retaining part 10 forms the inner surface 9 of annular joint 3 which delimits inner free space 6. The inner face of radial edge 14 of retaining part 10 constitutes an axial support surface 11 that blocks the axial movement of second annular part 8 with respect to first annular part 7.

Thus, inner surface 9 of annular joint 3, which delimits inner free space 6, is made up of the inner face of cylindrical part 12 of retaining part 10 and therefore forms a surface that is integral in itself and with first frame part 1, but which is free to rotate around axis X1 with respect to second frame part 2. When a user holds the bicycle by handle-like annular joint 3, as shown in FIG. 4, he rests his fingers on this surface 9 and therefore does not intercept any relative movement between the parts of annular joint 3.

Figure 1:
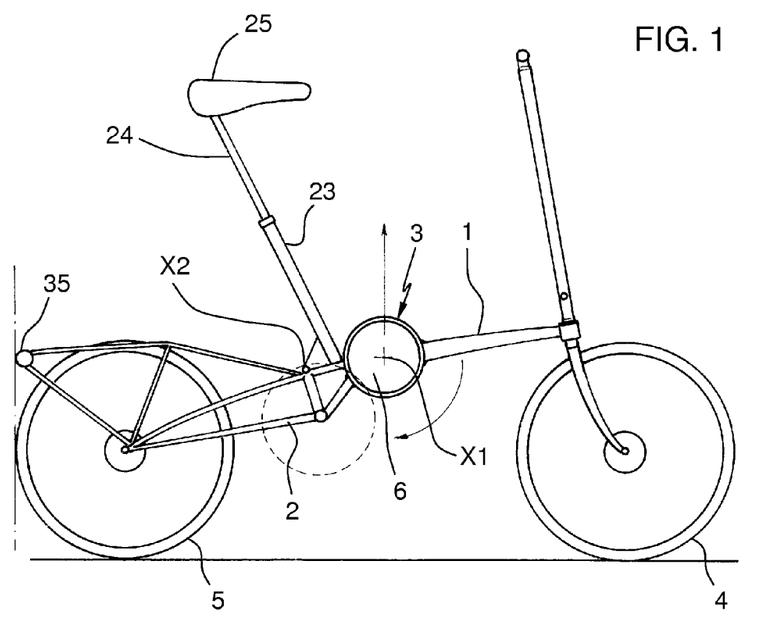
FIG. 1 is a side view of a first embodiment of the bicycle, in the unfolded position thereof.
Figure 2:
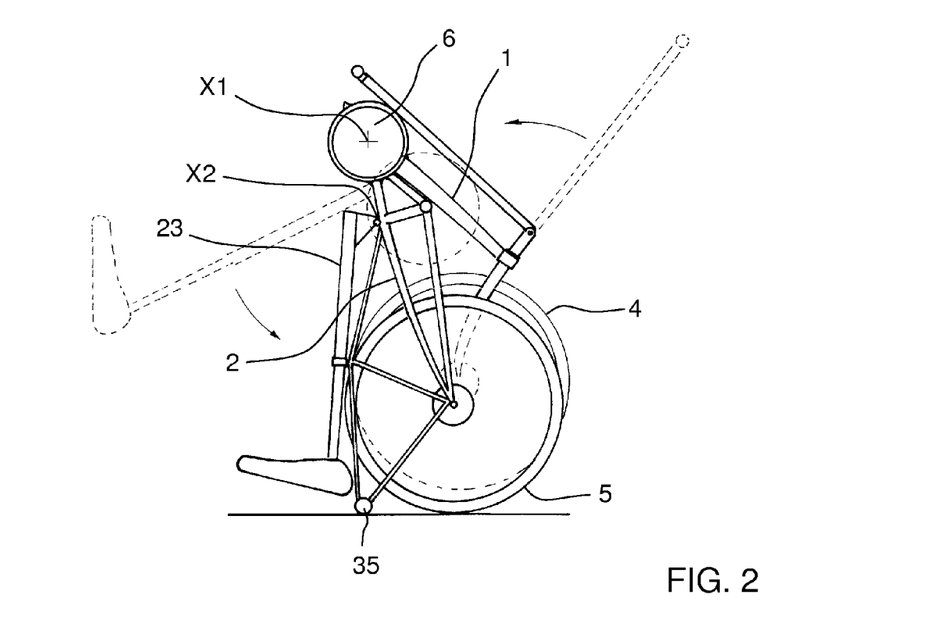
FIG. 2 is a side view of the bicycle in FIG. 1, in the folded position thereof.

Annular joint 3 is provided with end stop means that limit the trajectory of relative rotation of first and second frame parts 1, 2 one with respect to the other around axis X1, between a first end position corresponding to the unfolded position of the bicycle (FIGS. 1 and 5) and a second end position corresponding to the folded position of the bicycle (FIGS. 2 and 6). As can be seen in FIGS. 7 and 8, these endstop means are formed on the axially opposite faces of first and second annular parts 7, 8 and consist in a circular arched groove 18 formed on first annular part 7 that cooperates with a projection 19 formed on second annular part 8. Projection 19 slides freely inside groove 18, so that each of the two ends of groove 18 forms an end of stroke for projection 19.

FIG. 2 shows that the third frame part 23, which houses the shank 24 of the seat 25, can be lowered thanks to the fact that it can pivot around a pivoting axis X2. It is not considered necessary to describe in greater detail this lowering system of third frame part 23, as in this embodiment it does not interfere with the actual characteristics of the invention. As can be seen below, in other embodiments the lowering system comprises characteristics that are part of the invention.

Figure 9:
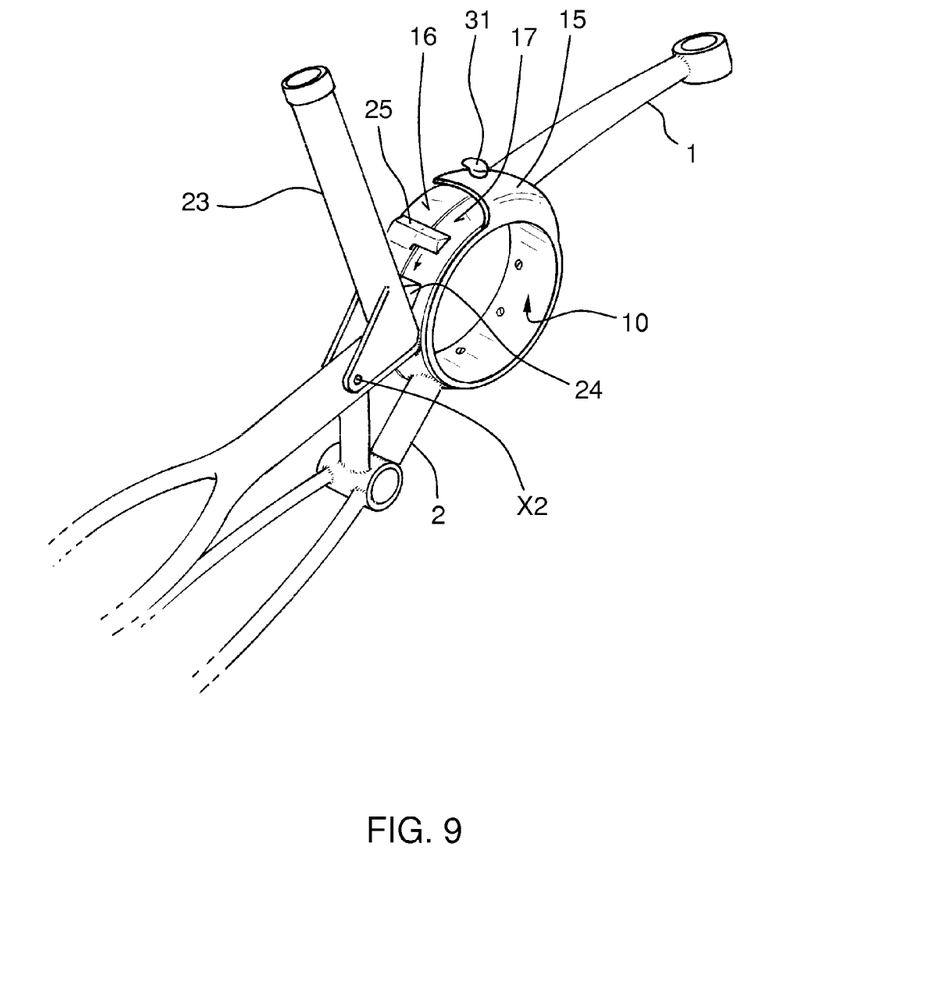
FIGS. 9, 10 and 11 are similar views to FIGS. 3, 7 and 8, showing a second embodiment.
Figure 10:
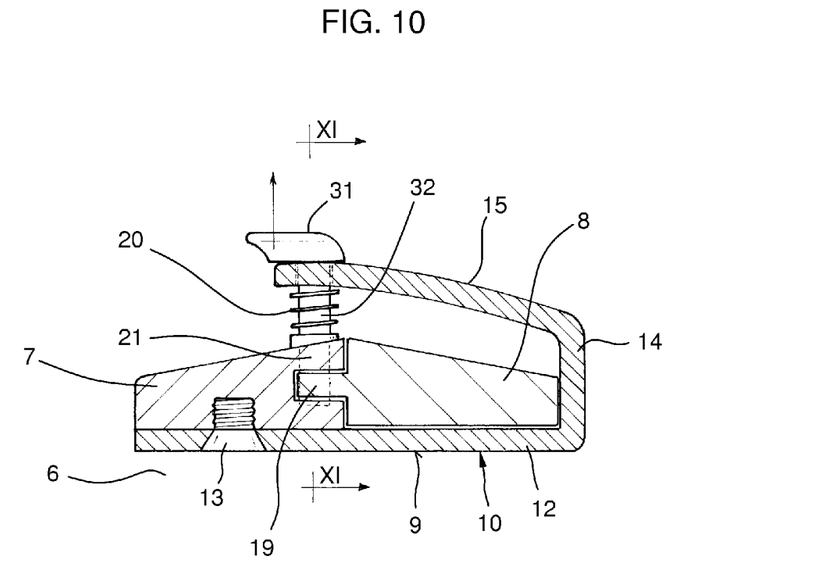
Figure 11:
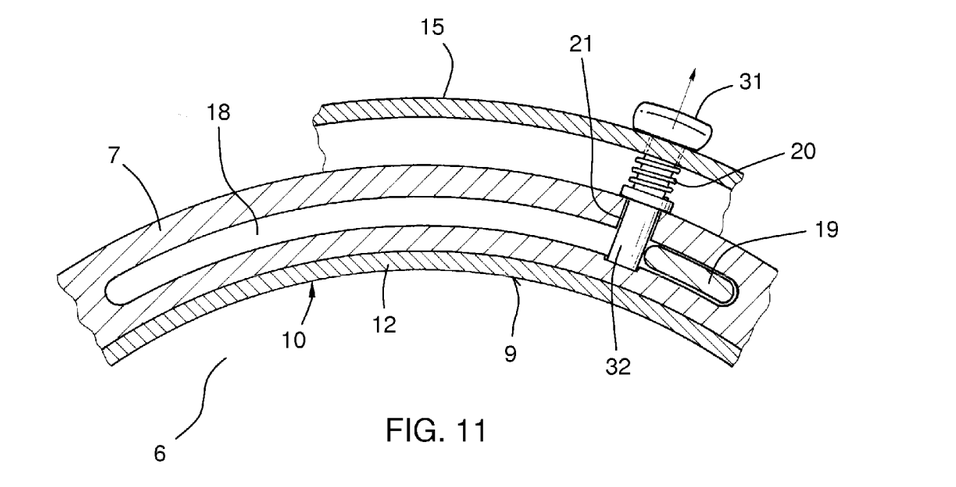

FIGS. 9 to 11 show a second embodiment, which differentiates from the first in that retaining part 10 extends into a cover 15 that covers a section of outer faces 16, 17 of first and second annular parts 7, 8, thus protecting the user's thumb from contact with said outer faces 16, 17 which slide with respect to each other. This second embodiment also differentiates from the first in that it has blocking means for blocking the relative angular position of first and second frame parts 1, 2 with respect to axis X1 in the bicycle's unfolded position. These blocking means are made up of a pin 32 that is inserted into hole 21 of first annular part 7 and comes out into groove 18, intercepting projection 19 when this abuts against the end of groove 18 in the bicycle's unfolded position, as shown in FIG. 11, so that it blocks the relative rotation between the two annular parts 7, 8. Pin 32 is mounted on cover 15 and is driven by a spring 20 which pushes it elastically towards groove 18. In order to release the blocking mechanism, the user pulls a pulling element 31 that is integral with pin 32 and located on top of cover 15.

Third frame part 23 is mounted in pivoting fashion on second frame part 2 so that it can pivot around a pivoting axis X2 between the lowered position shown in FIG. 2 and the upright position shown in FIG. 1. At the bottom of the tube forming this third frame part 23 near pivoting axis X2 a projection 24 is welded that forms a seating element on which there abuts a blocking element, said blocking element being integral with outer face 16 of first annular part 7, when said third frame part 23 is in the upright position and first and second frame parts are in the bicycle's unfolded position. FIG. 9 shows an intermediate position wherein the two frame parts 1, 2 are rotating towards the unfolded position. As can be seen in the figure, said blocking element consists of a projection 25 that is welded to outer face 16 of first annular part 7 and which extends in a cantilever arrangement over outer face 17 of second annular part 8, so that this cantilever extension abuts against projection 24, blocking the upright position of third frame part 23, when the bicycle is in the unfolded position.

Figure 12:
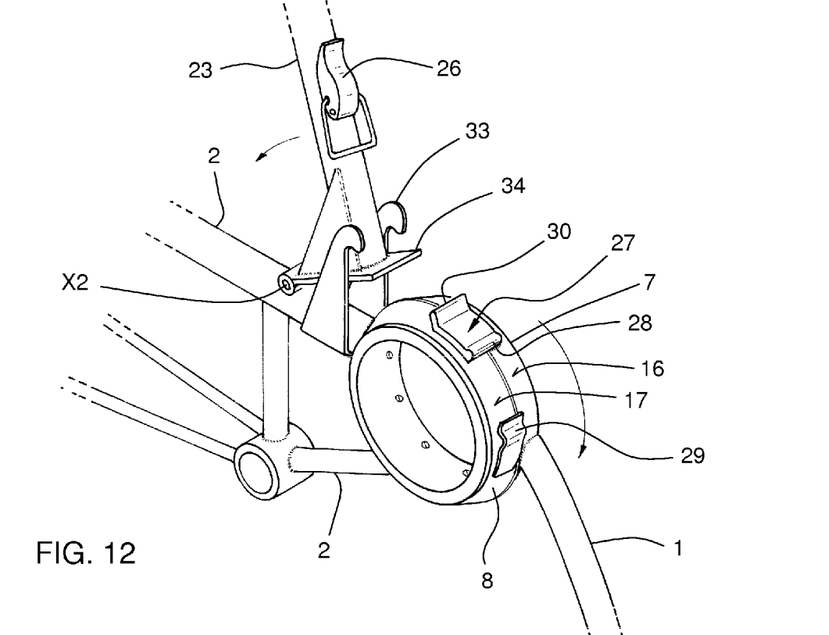
FIG. 12 is a partial perspective view showing the annular joint area of a third embodiment.
Figure 13:
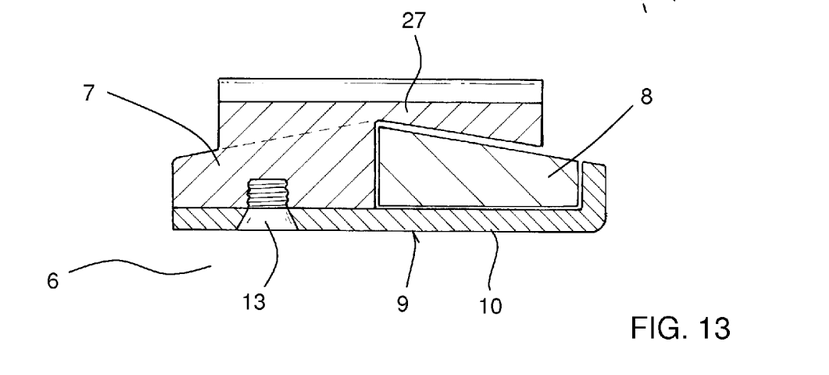
FIG. 13 is a partial cross-sectional view of the annular joint in FIG. 12.
Figure 14:
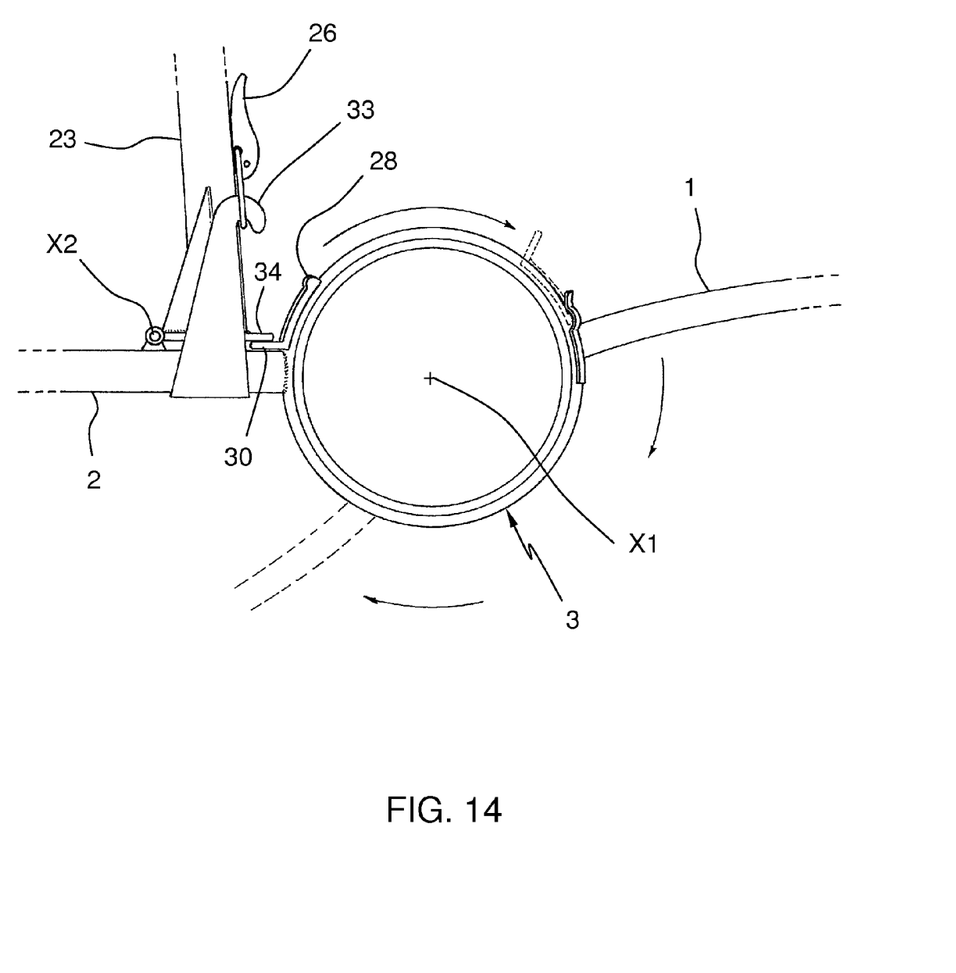
FIG. 14 is a partial side view showing how the third frame part is blocked and also the end of stroke retention of the two end rotation positions of the joint.

FIGS. 12 to 14 show a third embodiment, which differs from the first embodiment in that the ends top means, which limit the trajectory of relative rotation of first and second frame parts 1, 2, are not formed on the axially opposite faces of annular parts 7, 8, but are instead arranged on outer faces 16, 17 of said annular parts. Also, the blocking of the bicycle's unfolded position is achieved in co-operation with retention means that are arranged on third frame part 23 and which act when said third frame part is in the upright position.

Third frame part 23, which houses the shank of the bicycle seat, is mounted in pivoting fashion on second frame part 2 so that it can pivot around a pivoting axis X2 between a lowered position and an upright position. FIG. 12 shows an intermediate position between the lowered position and the upright position, whereas FIG. 14 shows the upright position. The blocking of third frame part 23 in this upright position is achieved by means of a quick closure made up of closing means, in the form of a ring lever 26, mounted at the bottom of the tube forming third frame part 23 near pivoting axis X2, and complementary closing means, in the form of a hook 33, arranged on one of the tubes forming second frame part 2 near said pivoting axis X2.

On outer face 16 of first annular part 7 a part 27 is welded which extends in a cantilever arrangement over outer face 17 of second annular part 8. A first end of said part 27 forms an edge 28 that constitutes a first endstop element which, in the bicycle's folded position, is retained by a first retention element arranged on said outer face 17 of second annular part 8. This first retention element is formed by a flexible plate 29 that is welded at one end to said outer face 17 of annular part 8 and which at its free end has an undulated shape complementary to that of edge 28 of part 27. In the bicycle's folded position, indicated by dotted lines in FIG. 14, edge 28 fits into said undulation of flexible plate 29 and remains there retained elastically, whereby the relative rotation of the two annular parts 7, 8 is blocked. This retained fit is of the spring catch type, in other words it occurs automatically when the two annular parts 7, 8 reach a relative position corresponding to the bicycle's folded position.

A second end of part 27 forms a tab 30 that constitutes a second endstop element which, in the bicycle's unfolded position, is retained by a second retention element that is arranged on third frame part 23 and which intercepts said tab 30 when third frame part 23 is in the upright position. This second retention element consists of a plate 34 that is arranged on the lower end of third frame part 23, where pivoting axis X2 is found. As can be seen in FIG. 14, in the bicycle's unfolded position, when third frame part 23 is in the upright position, plate 34 treads on tab 30.

Starting from the bicycle's folded position, in order to release this position and be able to unfold the bicycle the user slightly lifts the free end of flexible plate 29, thus releasing edge 28. The user holds the bicycle with his hand by handle-like annular joint 3 and lets the two frame parts 1, 2, thanks to their own weight, rotate around axis X1 to the unfolded position. In this position tab 30 abuts against the tube of second frame part 2, as can be seen in FIG. 14. The user then lifts third frame part 23 into the upright position, wherein plate 34 treads on tab 30, and blocks this upright position by means of the fast-acting closure 26, 33. So, advantageously, the blocking of the unfolded position of the bicycle and the blocking of the upright position of the third frame part are achieved in one and the same manoeuvre.

Starting now with the unfolded position of the bicycle, in order to release this position, the user opens the fast-acting closure 26, 33, thus releasing both the rotation of the two frame parts 1, 2 around axis X1 and the pivoting of third frame part 23 around axis X2. The user then can lower third frame part 23 to its lowered position and, supporting the bicycle with his hand by handle-like annular joint 3, pulls this joint upwards thus causing the two frame parts 1, 2, thanks to their own weight, to rotate around axis X1 into the folded position, which is blocked automatically by the spring catch of edge 28 on flexible plate 29, as described above.

As can be seen in FIGS. 1, 2, 5 and 6, also it has been envisaged that the bicycle comprises small wheels 35 mounted at the rear, in this case at the rear end of the carrier. These small wheels 35 are provided so that in the bicycle's folded position (FIG. 6) the bicycle can rest on said small wheels 35 and also on rear wheel 5. So, the user can comfortably move the bicycle while its wheels are turning by pulling handle-like annular joint 3 which, in this folded position of the bicycle, is positioned at one top end within reach of the users hand.

The invention claimed is:

1. A foldable bicycle, comprising:
    at least one first frame part that supports a front wheel of the bicycle and a second frame part that supports a rear wheel of the bicycle, said first frame part and said second frame part being joined together by a joint having one single geometrical rotation axis, said geometrical rotation axis being tilted with respect to a direction perpendicular to a longitudinal plane of the bicycle, so that, by means of a relative rotation of said first frame part and said second frame part with respect to each other around said geometrical rotation axis, the bicycle moves from an unfolded position, wherein said front wheel is aligned with said rear wheel in the longitudinal plane of the bicycle, to a folded position wherein said front wheel lies next to said rear wheel in a different plane;
    a handle which is pulled upwards to produce a movement from the unfolded position to the folded position of the bicycle via an actual weight of the bicycle and the relative rotation of said first frame part and said second frame part around said geometrical rotation axis, said joint being an annular joint, in a shape of a ring that delimits an inner free space that is wide enough to receive a hand of an adult across a whole width of fingers with an exception of a thumb, so that said annular joint constitutes said handle.

2. A foldable bicycle according to claim 1, wherein said annular joint comprises a first annular part that is integral with said first frame part, a second annular part that is integral with said second frame part, said first annular part and said second annular part fitting together in an axial direction of said geometrical rotation axis and said first annular part and said second annular part being able to rotate with respect to each other around said geometrical rotation axis, and a retaining part that is removably attached to only one of said first annular part and said second annular part and said retaining part comprising an axial support surface that blocks axial movement of another one of said first annular part and said second annular part.

3. A foldable bicycle according to claim 2, further comprising:
    blocking means for blocking a relative angular position of said first frame part and said second frame part, with respect to said geometrical rotation axis, at least in the unfolded position of the bicycle, said blocking means comprising a pin that is driven by elastic pushing means and which is inserted through a hole in one of said first annular part and said second annular part to intercept an inner element of another one of said first annular part and said second annular part, thus blocking relative rotation between said first annular part and said second annular part.

4. A foldable bicycle according to claim 3, wherein said pin comes into a groove through a hole in said first annular part and intercepts said projection when said projection abuts an end of said groove.

5. A foldable bicycle according to claim 4, wherein said pin is mounted on a cover and said pin is integral with a pulling element located on top of said cover.

6. A foldable bicycle according to claim 2, wherein said retaining part extends into a cover that covers a section of outer faces of said first annular part and said second annular part.

7. A foldable bicycle according to claim 6, wherein a pin is mounted on said cover and said pin is integral with a pulling element located on top of said cover.

8. A foldable bicycle according to claim 2, wherein said retaining part comprises a cylindrical part that covers inner faces of said first annular part and said second annular part and which is removably integral to just one of said first annular part and said second annular part by attachment means, so that an inner face of said cylindrical part constitutes an inner surface of said annular joint which delimits the inner free space, said retaining part comprising at one end of said cylindrical part a radial edge that extends radially in an opposite direction to said inner free space and the inner face of which constitutes an axial support surface of the retaining part.

9. A foldable bicycle according to claim 2, wherein each of said first annular part and said second annular part has a frustoconical outside face tilted with respect to said geometrical rotation axis of the annular joint, with a tilt of said frustoconical outside face of each of said first annular part and said second annular part being symmetrically opposite each other with respect to a diametrical plane of said annular joint, and with the first frame part and said second frame part being integral with said frustoconical outer face of each of said first annular part and said second annular part and arranged orthogonally thereto.

10. A foldable bicycle according to claim 1, wherein said annular joint comprises an endstop means which limits a trajectory of relative rotation of said first frame part and said second frame part with respect to one another around said geometrical rotation axis, between a first end position corresponding to the unfolded position of the bicycle and a second end position corresponding to the folded position of the bicycle.

11. A foldable bicycle according to claim 10, wherein said endstop means is formed on axially opposite ends of said first annular part and said second annular part and consist in a circular arched groove formed on one of said first annular part and said second annular part and a projection formed on another one of said first annular part and said second annular part, said projection sliding freely inside said circular arched groove, so that each of two ends of said groove forms an end of stroke for said projection.

12. A foldable bicycle according to claim 11, wherein a pin comes into a groove through a hole in said first annular part and intercepts a projection when said projection abuts an end of said groove.

13. A foldable bicycle according to claim 1, wherein an inner surface of said annular joint, which delimits said inner free space, is an integral surface and said inner surface is free to rotate, around said geometrical rotation axis, with respect to at least one of said first frame part and said second frame part.

14. A foldable bicycle according to claim 13, wherein said inner surface of said annular joint, which delimits said inner free space, is integral with only one of said first frame part and said second frame part and said inner surface is free to rotate, around said geometrical rotation axis, with respect to another one of said first frame part and said second frame part.

15. A foldable bicycle according to claim 2, further comprising:
a third frame part that houses a shank of a bicycle seat, said third frame part being mounted in pivoting fashion on said second frame part so that said third frame part can pivot around a pivoting axis between a lowered position and an upright position, wherein said third frame part has a seat element on which there abuts a blocking element, integral with an outer face of said first annular part, when said third frame part is in the upright position and said first frame part and said second frame part are in the unfolded position of the bicycle.

16. A foldable bicycle according to claim 2, further comprising:
a third frame part that houses a shank of a bicycle seat, said third frame part being mounted in pivoting fashion on said second frame part so that said third frame part can pivot around a pivoting axis between a lowered position and an upright position, said third frame part having closing means that cooperate with complementary closing means arranged on said second frame part to block a pivoting of said third frame part when said third frame is in the upright position, wherein an outer face of said first annular part integrally supports a first endstop element which extends in cantilever fashion over an outer face of said second annular part, said first endstop element being retained, in the folded position of the bicycle, by a first retention element arranged on said outer face of the second annular part, and said outer face of the first annular part integrally supports a second endstop element that is retained, in the unfolded position of the bicycle, by a second retention element that is arranged on said third frame part and which intercepts said second endstop element when said third frame part is in the upright position.

17. A foldable bicycle according to claim 2, wherein an endstop means is formed on axially opposite ends of said first annular part and said second annular part and consist in a circular arched groove formed on one of said first annular part and said second annular part and a projection formed on another one of said first annular part and said second annular part, said projection sliding freely inside said circular arched groove, so that each of two ends of said groove forms an end of stroke for said projection.

* * * * *